(12) United States Patent
Palum et al.

(10) Patent No.: US 8,452,082 B2
(45) Date of Patent: May 28, 2013

(54) PATTERN CONVERSION FOR INTERPOLATION

(75) Inventors: Russell J. Palum, Rochester, NY (US); Bruce H. Pillman, Rochester, NY (US)

(73) Assignee: Eastman Kodak Company, Rochester, NY (US)

( * ) Notice: Subject to any disclaimer, the term of this patent is extended or adjusted under 35 U.S.C. 154(b) by 1159 days.

(21) Appl. No.: 11/862,230

(22) Filed: Sep. 27, 2007

(65) Prior Publication Data

US 2009/0087087 A1    Apr. 2, 2009

(51) Int. Cl.
*G06K 9/18*    (2006.01)

(52) U.S. Cl.
USPC ........... 382/162; 382/166; 382/167; 382/289; 382/293; 348/180; 348/272; 348/222; 348/E5.041; 348/E3.018

(58) Field of Classification Search
USPC ............... 382/162, 166, 299, 300; 348/272, 348/273, 212, 222, 279, 180, E3.018, 222.1, 348/E5.041, E9.01, 241, 223.1, 266, 276, 348/277, 278, E5.091; 385/500, 512, 513, 385/514, 515, 516, 517, 518, 519, 520
See application file for complete search history.

(56) References Cited

U.S. PATENT DOCUMENTS

| | | | |
|---|---|---|---|
| 3,971,065 A | | 7/1976 | Bayer |
| 5,323,233 A | * | 6/1994 | Yamagami et al. ........... 348/277 |
| 6,366,318 B1 | * | 4/2002 | Smith et al. .................. 348/272 |
| 6,476,865 B1 | * | 11/2002 | Gindele et al. ............... 348/277 |
| 6,714,243 B1 | * | 3/2004 | Mathur et al. ................ 348/273 |
| 6,937,774 B1 | * | 8/2005 | Specht et al. ................ 382/254 |
| 7,688,368 B2 | * | 3/2010 | Kijima et al. ................ 348/272 |
| 7,750,959 B2 | * | 7/2010 | Nomura ........................ 348/294 |
| 7,780,089 B2 | * | 8/2010 | Wang ........................ 235/462.45 |
| 8,139,130 B2 | * | 3/2012 | Compton et al. ............. 348/277 |
| 2006/0044427 A1 | * | 3/2006 | Hu ................................ 348/266 |
| 2007/0127095 A1 | * | 6/2007 | Sugimori ..................... 358/520 |
| 2007/0177236 A1 | * | 8/2007 | Kijima et al. ................ 358/514 |
| 2008/0130991 A1 | * | 6/2008 | O'Brien et al. .............. 382/167 |
| 2008/0131028 A1 | * | 6/2008 | Pillman et al. ............... 382/299 |
| 2009/0051984 A1 | * | 2/2009 | O'Brien et al. .............. 358/514 |
| 2010/0302423 A1 | * | 12/2010 | Adams et al. ................ 348/302 |

* cited by examiner

*Primary Examiner* — Mekonen Bekele
(74) *Attorney, Agent, or Firm* — Raymond L. Owens

(57) ABSTRACT

A method of processing a digital image having a predetermined color pattern, includes converting the predetermined color pattern of the digital image into a converted digital image having a different desired color pattern; and using algorithms adapted for use with the desired color pattern for processing the converted digital image.

4 Claims, 10 Drawing Sheets

| 500 | | | |
|---|---|---|---|
| P0 | G1 | P2 | R3 |
| G4 | P5 | R6 | P7 |
| P8 | B9 | P10 | G11 |
| B12 | P13 | G14 | P15 |

FIG. 5A

| 505 | | | |
|---|---|---|---|
| (P0) | G1 | (P2) | R3 |
| G4 | (P5) | R6 | (P7) |
| (P8) | B9 | (P10) | G11 |
| B12 | (P13) | G14 | (P15) |

FIG. 5B

| 510 | | |
|---|---|---|
| (PI0) | (PI1) | (PI2) |
| (PI3) | (PI4) | (PI5) |
| (PI6) | (PI7) | (PI8) |

FIG. 5C

| 520 | | |
|---|---|---|
| (PI0) | | (PI2) |
| | | |
| (PI6) | | (PI8) |

FIG. 5D

| 525 | | | |
|---|---|---|---|
| P0 | (G1) | P2 | (R3) |
| (G4) | P5 | (R6) | P7 |
| P8 | (B9) | P10 | (G11) |
| (B12) | P13 | (G14) | P15 |

FIG. 5E

| 530 | | |
|---|---|---|
| (GI0) | | (RI2) |
| | | |
| (BI6) | | (GI8) |

FIG. 5F

| 540 | | |
|---|---|---|
| (RGB I0) | | (RGB I2) |
| | | |
| (RGB I6) | | (RGB I8) |

FIG. 5G

| 550 | | |
|---|---|---|
| (RGB D0) | | (RGB D2) |
| | | |
| (RGB D6) | | (RGB D8) |

FIG. 5H

| 580 | | |
|---|---|---|
| (RGB D0) | (RGB D1) | (RGB D2) |
| (RGB D3) | (RGB D4) | (RGB D5) |
| (RGB D6) | (RGB D7) | (RGB D8) |

FIG. 5I

| 590 | | |
|---|---|---|
| (RGB 0) | (RGB 1) | (RGB 2) |
| (RGB 3) | (RGB 4) | (RGB 5) |
| (RGB 6) | (RGB 7) | (RGB 8) |

FIG. 5J

| 600 | | | |
|---|---|---|---|
| G0 | R1 | G2 | R3 |
| B4 | P5 | B6 | P7 |
| G8 | R9 | G10 | R11 |
| B12 | P13 | B14 | P15 |

*FIG. 7A*

| 610 | | | |
|---|---|---|---|
|  |  |  |  |
|  | P5 |  | P7 |
|  |  |  |  |
|  | P13 |  | P15 |

*FIG. 7B*

| 615 | | |
|---|---|---|
| P5 | PT6 | P7 |
| PT9 |  | PT11 |
| P13 | PT14 | P15 |

*FIG. 7C*

| 620 | | | |
|---|---|---|---|
| P0 |  | P2 |  |
|  | P5 |  | P7 |
| P8 |  | P10 |  |
|  | P13 |  | P15 |

*FIG. 7D*

| 640 | | | |
|---|---|---|---|
| P0 | P1 | P2 | P3 |
| P4 | P5 | P6 | P7 |
| P8 | P9 | P10 | P11 |
| P12 | P13 | P14 | P15 |

*FIG. 7E*

| 650 | | |
|---|---|---|
| G0 | GT1 | G2 |
| GT4 | G5 | GT6 |
| G8 | GT9 | G10 |

*FIG. 7F*

| 660 | | | |
|---|---|---|---|
| G0 | R1 | G2 | R3 |
| B4 | G5 | B6 | G7 |
| G8 | R9 | G10 | R11 |
| B12 | G13 | B14 | G15 |

*FIG. 7G*

| 670 | | | |
|---|---|---|---|
| RGB 0 | RGB 1 | RGB 2 | RGB 3 |
| RGB 4 | RGB 5 | RGB 6 | RGB 7 |
| RGB 8 | RGB 9 | RGB 10 | RGB 11 |
| RGB 12 | RGB 13 | RGB 14 | RGB 15 |

| P0 | R1 | P2 | R3 |
|----|----|----|----|
| B4 | P5 | B6 | P7 |
| P8 | R9 | P10 | R11 |
| B12 | P13 | B14 | P15 |

PATTERN CONVERSION FOR INTERPOLATION

CROSS REFERENCE TO RELATED APPLICATIONS

Reference is made to commonly assigned U.S. patent application Ser. No. 11/565,140, filed Nov. 30, 2006, entitled "Processing Images Having Color and Panchromatic Pixels" by Michele O'Brien et al and U.S. patent application Ser. No. 11/565,157, filed Nov. 30, 2006, entitled "Producing Low Resolution Images" by Bruce H. Pillman et al, the disclosures of which are incorporated herein.

FIELD OF THE INVENTION

This invention relates to providing a two-dimensional color image starting from a color pattern image.

BACKGROUND OF THE INVENTION

An electronic imaging system depends on an electronic image sensor to create an electronic representation of a visual image. Examples of such electronic image sensors include charge coupled device (CCD) image sensors and active pixel sensor (APS) devices (APS devices are often referred to as CMOS sensors because of the ability to fabricate them in a Complementary Metal Oxide Semiconductor process). Typically, these image sensors include a number of light sensitive pixels, often arranged in a regular pattern of rows and columns. For capturing color images, a pattern of filters called a color filter array (CFA), is typically fabricated on the pattern of pixels, with different filter materials being used to make individual pixels sensitive to only a portion of the visible light spectrum. The most common two-dimensional CFA pattern is the Bayer CFA pattern U.S. Pat. No. 3,971,065. When a CFA is employed, some way of combining spatially separated pixels that sample different spectral bands (different colors or possibly different wavelength bands outside the visible region) is required. This process is called demosaicing or CFA interpolation.

While the terminology used here started with color filter arrays, it is possible for a single channel image to have a color pattern like a CFA pattern, even though there is not a one to one correspondence between the pixels in the image and individual filtered photoreceptors on an image sensor. These images have spatially separated pixels that sample different spectral bands (different colors or possibly different wavelength bands extending outside the visible region). These images are referred to as color pattern images and include images captured with a color filter array as a subset of color pattern images.

A color pattern is defined by the combination of a minimal repeating unit and set of effective spectral sensitivities. Processing an image with an RGB Bayer color pattern to produce a smaller image with an RGB Bayer color pattern is known in the prior art, such as in U.S. Pat. No. 6,366,318. This processing changes the size of a color pattern image, but does not produce an image with a different color pattern.

For any of these color pattern images, if one or more of the wavelength bands extend outside the visible region, the resulting fully populated image may be a pseudo color image.

In this discussion, the full size of a color pattern image is defined as the pixel dimension of the single channel color pattern image, regardless of the color pattern. The result of color pattern interpolation is to produce an image with multiple color channels populated for each pixel. Often, the image output from color pattern interpolation has the same dimensions as the starting single channel color pattern image. Interpolation of a single channel color pattern image can also produce a smaller or larger output image, but in all cases, multiple color channels are populated for each pixel. It is common for the output image to be smaller than the input image, for example in preparing a low-resolution preview image from a large color pattern image.

A poor color pattern interpolation will produce color and spatial artifacts that are not consistent with the original scene. The Bayer pattern has a long history so there are a large number of techniques available for converting a Bayer color pattern image into a full color image. Because these techniques have been developed over an extended period of time they are fairly efficient and robust, providing good color pattern interpolation.

In development of image sensors with novel CFA patterns, there is a need for the development of complementary processing algorithms. At the same time, there is an existing base of well-understood algorithms and hardware optimized for existing color pattern patterns such as the Bayer CFA. There is a need to process images with novel color patterns using existing algorithms and hardware.

SUMMARY OF THE INVENTION

It is therefore an object of the present invention to provide an improved way of interpolating color pattern images to full color images or pseudo color images so the resulting image better represents the original subject.

The object is achieved by a method of processing a digital image having a predetermined color pattern, comprising:

(a) converting the predetermined color pattern of the digital image into a converted digital image having a different desired color pattern; and (b) using algorithms adapted for use with the desired color pattern for processing the converted digital image.

This and other aspects, objects, features and advantages of the present invention will be more clearly understood and appreciated from a review of the following detailed description of the preferred embodiments and appended claims, and by reference to the accompanying drawings.

BRIEF DESCRIPTION OF THE DRAWINGS

FIGS. 5A-5J illustrate several steps in the process shown in FIG. 4;

FIGS. 7A-7H illustrate several steps in the process shown in FIG. 6;

FIG. 9 illustrates a step in the process shown in FIG. 8;

FIGS. 11A-11F illustrate several steps in the process shown in FIG. 10.

DETAILED DESCRIPTION OF THE INVENTION

Because digital cameras employing imaging devices and related circuitry for signal capture and correction and for exposure control are well known, the present description will be directed in particular to elements forming part of, or cooperating more directly with, method and apparatus in accordance with the present invention. Elements not specifically shown or described herein are selected from those known in the art. Certain aspects of the embodiments to be described are provided in software. Given the system as shown and described according to the invention in the following materials, software not specifically shown, described or suggested herein that is useful for implementation of the invention is conventional and within the ordinary skill in such arts.

Figure 1:
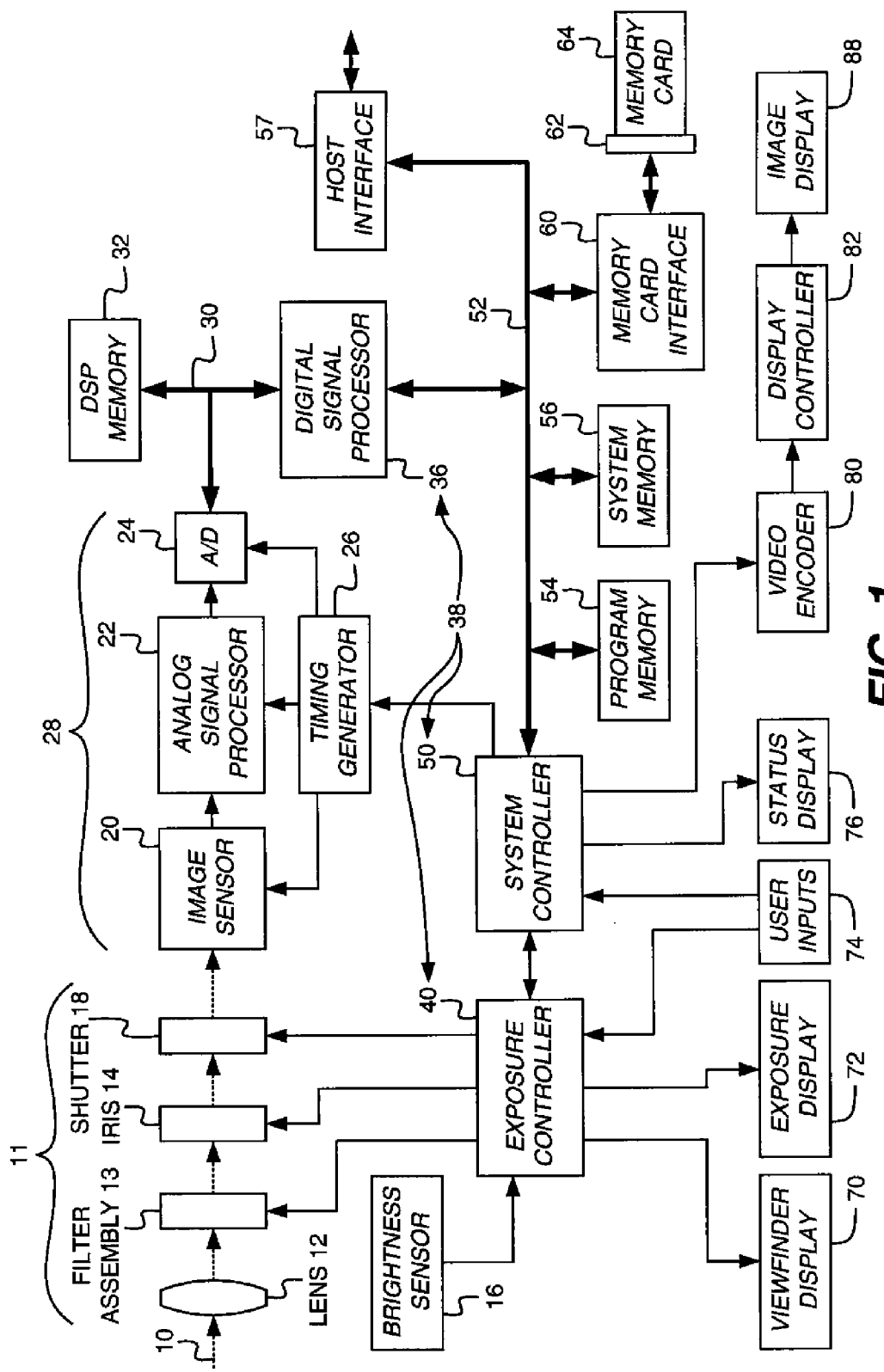
FIG. 1 is a block diagram of a conventional digital still camera system that can employ a conventional sensor and processing methods or the sensor and processing methods of the current invention.

Turning now to FIG. 1, a block diagram of an image capture device shown as a digital camera embodying the present invention is shown. Although a digital camera will now be explained, the present invention is clearly applicable to other types of image capture devices. In the disclosed camera, light 10 from the subject scene is input to an imaging stage 11, where the light is focused by a lens 12 to form an image on a solid state image sensor 20. Image sensor 20 converts the incident light to an electrical signal for each picture element (pixel). The image sensor 20 of the preferred embodiment is a charge coupled device (CCD) type or an active pixel sensor (APS) type (APS devices are often referred to as CMOS sensors because of the ability to fabricate them in a Complementary Metal Oxide Semiconductor process). Other types of image sensors having two-dimensional array of pixels are used provided that they employ the patterns of the present invention. The present invention also makes use of an image sensor 20 having a two-dimensional array of pixels that can be divided into groups that are sensitive to different wavelength bands. The groups of pixels are in a pattern with some minimum repeating element. An iris block 14 and a filter block 13 regulate the amount of light reaching the image sensor 20. The iris block 14 varies the aperture and a filter block 13 includes one or more ND filters interposed in the optical path. Also regulating the overall light level is the time that a shutter block 18 is open. An exposure controller block 40 responds to the amount of light available in the scene as metered by a brightness sensor block 16 and controls all three of these regulating functions.

This description of a particular camera configuration will be familiar to one skilled in the art, and it will be obvious that many variations and additional features are present. For example, an autofocus system is added, or the lenses are detachable and interchangeable. It will be understood that the present invention is applied to any type of digital camera, where similar functionality is provided by alternative components. For example, the digital camera is a relatively simple point and shoot digital camera, where the shutter 18 is a relatively simple movable blade shutter, or the like, instead of the more complicated focal plane arrangement. The present invention can also be practiced on imaging components included in non-camera devices such as mobile phones and automotive vehicles.

The analog signal from image sensor 20 is processed by an analog signal processor 22 and applied to an analog to digital (A/D) converter 24. A timing generator 26 produces various clocking signals to select rows and pixels and synchronizes the operation of analog signal processor 22 and A/D converter 24. An image sensor stage 28 includes the image sensor 20, the analog signal processor 22, the A/D converter 24, and the timing generator 26. The components of image sensor stage 28 are separately fabricated integrated circuits, or they are fabricated as a single integrated circuit as is commonly done with CMOS image sensors. The resulting stream of digital pixel values from A/D converter 24 is stored in memory 32 associated with a digital signal processor (DSP) 36.

Digital signal processor 36 is one of three processors or controllers in this embodiment, in addition to a system controller 50 and exposure controller 40. Although this partitioning of camera functional control among multiple controllers and processors is typical, these controllers or processors are combined in various ways without affecting the functional operation of the camera and the application of the present invention. These controllers or processors can include one or more digital signal processor devices, microcontrollers, programmable logic devices, or other digital logic circuits. Although a combination of such controllers or processors has been described, it should be apparent that one controller or processor is designated to perform all of the needed functions. All of these variations can perform the same function and fall within the scope of this invention, and the term "processing stage" will be used as needed to encompass all of this functionality within one phrase, for example, as in processing stage 38 in FIG. 1.

In the illustrated embodiment, DSP 36 manipulates the digital image data in its memory 32 according to a software program permanently stored in program memory 54 and copied to memory 32 for execution during image capture. DSP 36 executes the software necessary for practicing image processing shown in FIG. 18. Memory 32 includes of any type of random access memory, such as SDRAM. A bus 30 includes a pathway for address and data signals connects DSP 36 to its related memory 32, A/D converter 24 and other related devices.

System controller 50 controls the overall operation of the camera based on a software program stored in program memory 54, which can include Flash EEPROM or other nonvolatile memory. This memory can also be used to store image sensor calibration data, user setting selections and other data which must be preserved when the camera is turned off. System controller 50 controls the sequence of image capture by directing exposure controller 40 to operate the lens 12, ND filter 13, iris 14, and shutter 18 as previously described, directing the timing generator 26 to operate the image sensor 20 and associated elements, and directing DSP 36 to process the captured image data. After an image is captured and processed, the final image file stored in memory 32 is transferred to a host computer via interface 57, stored on a removable memory card 64 or other storage device, and displayed for the user on an image display 88.

A bus 52 includes a pathway for address, data and control signals, and connects system controller 50 to DSP 36, program memory 54, system memory 56, host interface 57, memory card interface 60 and other related devices. Host interface 57 provides a high-speed connection to a personal computer (PC) or other host computer for transfer of image data for display, storage, manipulation or printing. This interface is an IEEE1394 or USB2.0 serial interface or any other suitable digital interface. Memory card 64 is typically a Compact Flash (CF) card inserted into a memory card socket 62 and connected to the system controller 50 via memory card interface 60. Other types of storage that are utilized include without limitation PC-Cards, MultiMedia Cards (MMC), or Secure Digital (SD) cards.

Processed images are copied to a display buffer in system memory 56 and continuously read out via video encoder 80 to produce a video signal. This signal is output directly from the camera for display on an external monitor, or processed by a display controller 82 and presented on image display 88. This display is typically an active matrix color liquid crystal display (LCD), although other types of displays are used as well.

The user interface, including all or any combination of a viewfinder display 70, an exposure display 72, a status display 76 and image display 88, and user inputs 74, is controlled by a combination of software programs executed on exposure controller 40 and system controller 50. The user inputs 74 typically includes some combination of buttons, rocker switches, joysticks, rotary dials or touch screens. Exposure controller 40 operates light metering, exposure mode, autofocus and other exposure functions. The system controller 50 manages the graphical user interface (GUI) presented on one or more of the displays, e.g., on image display 88. The GUI typically includes menus for making various option selections and review modes for examining captured images.

Exposure controller 40 accepts user inputs 74 selecting exposure mode, lens aperture, exposure time (shutter speed), and exposure index or ISO speed rating and directs the lens and shutter accordingly for subsequent captures. Brightness sensor 16 is employed to measure the brightness of the scene and provide an exposure meter function for the user to refer to when manually setting the ISO speed rating, aperture and shutter speed. In this case, as the user changes one or more settings, the light meter indicator presented on viewfinder display 70 tells the user to what degree the image will be over or underexposed. In an automatic exposure mode, the user changes one setting and the exposure controller 40 automatically alters another setting to maintain correct exposure, e.g., for a given ISO speed rating when the user reduces the lens aperture the exposure controller 40 automatically increases the exposure time to maintain the same overall exposure.

The ISO speed rating is an important attribute of a digital still camera. The exposure time, the lens aperture, the lens transmittance, the level and spectral distribution of the scene illumination, and the scene reflectance determine the exposure level of a digital still camera. When an image from a digital still camera is obtained using an insufficient exposure, proper tone reproduction can generally be maintained by increasing the electronic or digital gain, but the image will contain an unacceptable amount of noise. As the exposure is increased, the gain is decreased, and therefore the image noise can normally be reduced to an acceptable level. If the exposure is increased excessively, the resulting signal in bright areas of the image can exceed the maximum signal level capacity of the image sensor or camera signal processing. This can cause image highlights to be clipped to form a uniformly bright area, or to bloom into surrounding areas of the image. It is important to guide the user in setting proper exposures. An ISO speed rating is intended to serve as such a guide. In order to be easily understood by photographers, the ISO speed rating for a digital still camera should directly relate to the ISO speed rating for photographic film cameras. For example, if a digital still camera has an ISO speed rating of ISO 200, then the same exposure time and aperture should be appropriate for an ISO 200 rated film/process system.

The ISO speed ratings are intended to harmonize with film ISO speed ratings. However, there are differences between electronic and film-based imaging systems that preclude exact equivalency. Digital still cameras can include variable gain, and can provide digital processing after the image data has been captured, enabling tone reproduction to be achieved over a range of camera exposures. It is therefore possible for digital still cameras to have a range of speed ratings. This range is defined as the ISO speed latitude. To prevent confusion, a single value is designated as the inherent ISO speed rating, with the ISO speed latitude upper and lower limits indicating the speed range, that is, a range including effective speed ratings that differ from the inherent ISO speed rating. With this in mind, the inherent ISO speed is a numerical value calculated from the exposure provided at the focal plane of a digital still camera to produce specified camera output signal characteristics. The inherent speed is usually the exposure index value that produces peak image quality for a given camera system for normal scenes, where the exposure index is a numerical value that is inversely proportional to the exposure provided to the image sensor.

The foregoing description of a digital camera will be familiar to one skilled in the art. It will be obvious that there are many variations of this embodiment that are possible and is selected to reduce the cost, add features or improve the performance of the camera. The following description will disclose in detail the operation of this camera for capturing images according to the present invention. Although this description is with reference to a digital camera, it will be understood that the present invention applies for use with any type of image capture device having an image sensor with color and panchromatic pixels.

The image sensor 20 shown in FIG. 1 typically includes a two-dimensional array of light sensitive pixels fabricated on a silicon substrate that provide a way of converting incoming light at each pixel into an electrical signal that is measured. As the image sensor 20 is exposed to light, free electrons are generated and captured within the electronic structure at each pixel. Capturing these free electrons for some period of time and then measuring the number of electrons captured, or measuring the rate at which free electrons are generated can measure the light level at each pixel. In the former case, accumulated charge is shifted out of the array of pixels to a charge to voltage measurement circuit as in a charge coupled device (CCD), or the area close to each pixel can contain elements of a charge to voltage measurement circuit as in an active pixel sensor (APS or CMOS sensor).

Whenever general reference is made to an image sensor in the following description, it is understood to be representative of the image sensor 20 from FIG. 1. It is further understood that all examples and their equivalents of image sensor architectures and pixel patterns of the present invention disclosed in this specification is used for image sensor 20.

In the context of an image sensor, a pixel (a contraction of "picture element") refers to a discrete light sensing area and charge shifting or charge measurement circuitry associated with the light sensing area. In the context of a digital color image, the term pixel commonly refers to a particular location in the image having associated color values.

Figure 2:
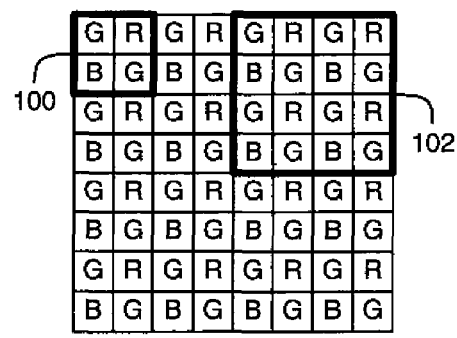
FIG. 2 (prior art) is conventional Bayer color filter array pattern showing a minimal repeating unit and a non-minimal repeating unit.

In order to produce a color image, the array of pixels in an image sensor typically has a pattern of color filters placed over them. FIG. 2 shows a pattern of red, green, and blue color filters that is commonly used. This particular pattern is commonly known as a Bayer color filter array (CFA) after its inventor Bryce Bayer as disclosed in U.S. Pat. No. 3,971,065. This pattern is effectively used in image sensors having a two-dimensional array of color pixels. As a result, each pixel has a particular color photoresponse that, in this case, is a predominant sensitivity to red, green or blue light. Another useful variety of color photoresponses is a predominant sensitivity to magenta, yellow, or cyan light. In each case, the particular color photoresponse has high sensitivity to certain portions of the visible spectrum, while simultaneously having low sensitivity to other portions of the visible spectrum. The term color pixel will refer to a pixel having a spectrally selective photoresponse. Note that this definition specifically can include spectral sensitivities that go outside the visible range.

The set of color photoresponses selected for use in a sensor usually has three colors, as shown in the Bayer CFA, but it can also include four or more. As used herein, a panchromatic photoresponse refers to a photoresponse having a wider spectral sensitivity than those spectral sensitivities represented in the selected set of color photoresponses. A panchromatic photosensitivity can have high sensitivity across the entire visible spectrum. The term panchromatic pixel will refer to a pixel having a panchromatic photoresponse. Although the panchromatic pixels generally have a wider spectral sensitivity than the set of color photoresponses, each panchromatic pixel can have an associated filter. Such filter is either a neutral density filter or a color filter.

When a pattern of color and panchromatic pixels is on the face of an image sensor, each such pattern has a repeating unit that is a contiguous sub array of pixels that acts as a basic building block. By juxtaposing multiple copies of the repeating unit, the entire sensor pattern is produced. The juxtaposition of the multiple copies of repeating units is done in diagonal directions as well as in the horizontal and vertical directions.

A minimal repeating unit is a repeating unit such that no other repeating unit has fewer pixels. For example, the CFA in FIG. 2 includes a minimal repeating unit that is two pixels by two pixels as shown by pixel block 100 in FIG. 2. Multiple copies of this minimal repeating unit are tiled to cover the entire array of pixels in an image sensor. The minimal repeating unit is shown with a green pixel in the upper right corner, but three alternative minimal repeating units can easily be discerned by moving the heavy outlined area one pixel to the right, one pixel down, or one pixel diagonally to the right and down. Although pixel block 102 is a repeating unit, it is not a minimal repeating unit because pixel block 100 is a repeating unit and pixel block 100 has fewer pixels than pixel block 102.

An image captured using an image sensor having a two-dimensional array with the CFA of FIG. 2 has only one color value at each pixel. In order to produce a full color image, there are a number of techniques for inferring or interpolating the missing colors at each pixel. These CFA or color pattern interpolation techniques are well known in the art and reference is made to the following U.S. Pat. Nos. 5,506,619; 5,629,734; and 5,652,621.

Figure 3:
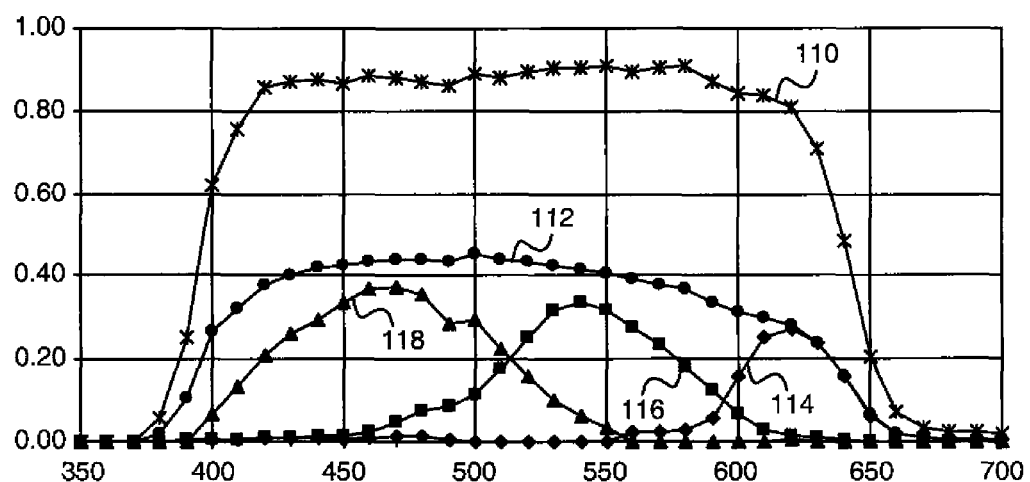
FIG. 3 provides representative spectral quantum efficiency curves for red, green, and blue pixels, as well as a wider spectrum panchromatic quantum efficiency, all multiplied by the transmission characteristics of an infrared cut filter.

FIG. 3 shows the relative spectral sensitivities of the pixels with red, green, and blue color filters in a typical camera application. The X-axis in FIG. 3 represents light wavelength in nanometers, and the Y-axis represents efficiency. In FIG. 3, curve 110 represents the spectral transmission characteristic of a typical filter used to block infrared and ultraviolet radiation from reaching the image sensor. Such a filter is needed because the color filters used for image sensors typically do not block infrared radiation, hence the pixels are unable to distinguish between infrared radiation and light that is within the pass bands of their associated color filters. The infrared blocking characteristic shown by curve 110 prevents infrared radiation from corrupting the visible light signal. The spectral quantum efficiency, i.e. the proportion of incident photons that are captured and converted into a measurable electrical signal, for a typical silicon sensor with red, green, and blue filters applied is multiplied by the spectral transmission characteristic of the infrared blocking filter represented by curve 110 to produce the combined system quantum efficiencies represented by curve 114 for red, curve 116 for green, and curve 118 for blue. It is understood from these curves that each color photoresponse is sensitive to only a portion of the visible spectrum. By contrast, the photoresponse of the same silicon sensor that does not have color filters applied (but including the infrared blocking filter characteristic) is shown by curve 112; this is an example of a panchromatic photoresponse. By comparing the color photoresponse curves 114, 116, and 118 to the panchromatic photoresponse curve 112, it is clear that the panchromatic photoresponse is three to four times more sensitive to wide spectrum light than any of the color photoresponses. In the case where spectral sensitivity outside the visible range is desired, such as a camera providing pseudo color images from IR, visible, and UV data, the infrared blocking filter will need to be adjusted in concert with the CFA filtration to provide the desired overall spectral sensitivity.

The greater panchromatic sensitivity shown in FIG. 3 permits improving the overall sensitivity of an image sensor by intermixing pixels that include color filters with pixels that do not include color filters. This process produces pixels with different effective spectral sensitivities then the original color pixels or the panchromatic pixels. Intermixing pixels having the same spectral sensitivity produces pixels that have the same effective spectral sensitivity as the original pixels.

Figure 4:
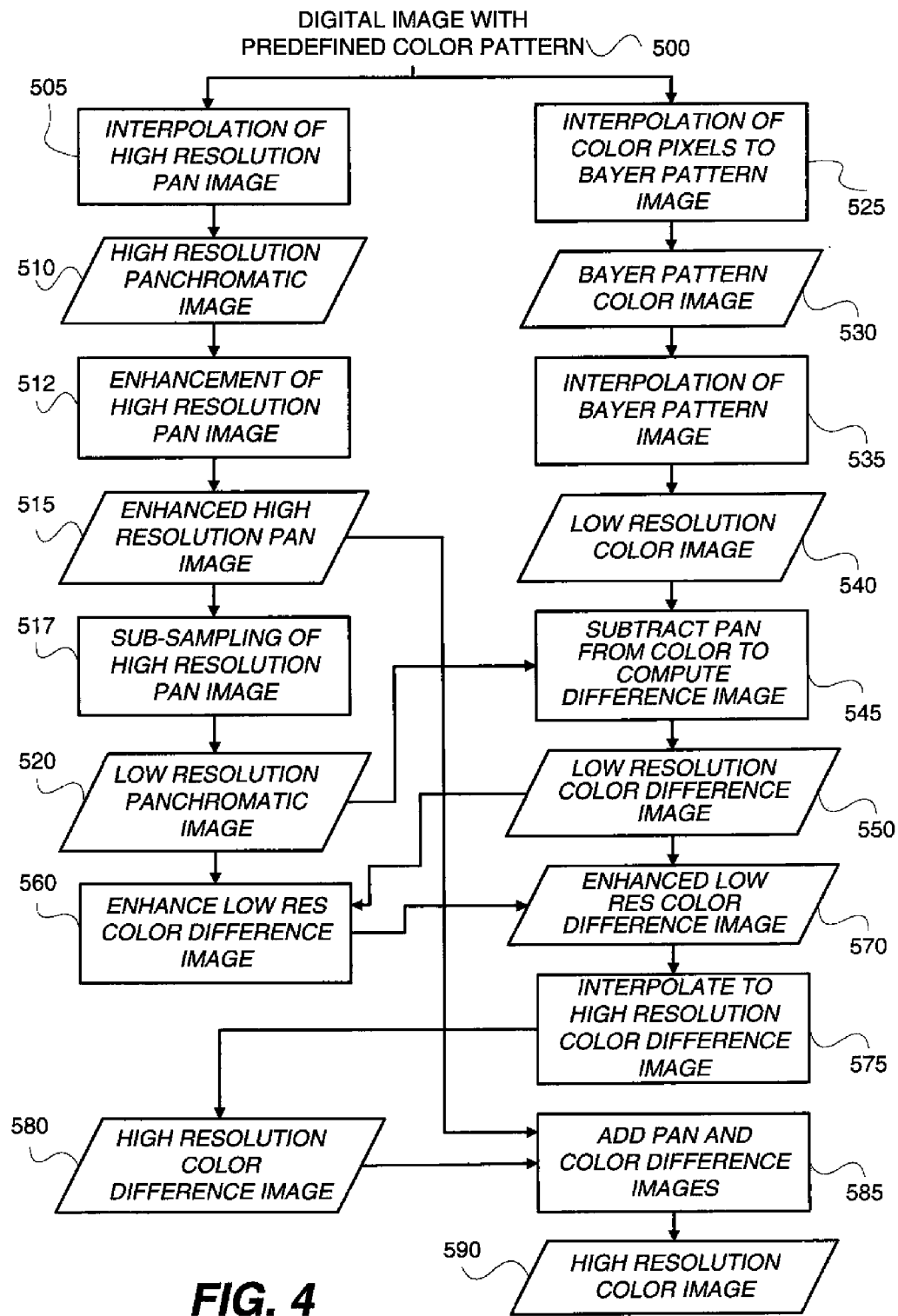
FIG. 4 is a block diagram for processing an image with a predefined color pattern to a full color image.

A preferred embodiment of this invention is shown in FIG. 4, which applies for a predefined color pattern shown below:

| P | G | P | R |
|---|---|---|---|
| G | P | R | P |
| P | B | P | G |
| B | P | G | P |

In this embodiment, a color image with a predefined color pattern 500, is processed to a high-resolution color image 590. The predefined color pattern is illustrated in FIG. 5A.

The first step in processing this image is to interpolate 505 panchromatic pixels in the predefined color pattern to a high-resolution panchromatic image 510. A preferred method for doing this is bilinear interpolation, illustrated by the diagonal lines connecting pairs of circled pixels in FIG. 5B. Specifically, several of the pixels shown in FIG. 5C are computed as follows:

PI0=(P0+P5)/2
PI1=(P2+P5)/2
PI2=(P2+P7)/2
PI3=(P5+P8)/2

The high-resolution panchromatic image can be enhanced 512. This enhancement can include sigma filtering noise reduction, taking care not to infringe on the image detail. The resulting enhanced high-resolution panchromaticimage 515 is used for enhancement of the color image. In step 517, the enhanced high-resolution panchromaticimage 515 is sub-sampled so it is the same size as the interpolated low-resolution color image 540, producing a low-resolution panchromaticimage 520. The low-resolution panchromaticimage 520 is shown in FIG. 5D.

The color pixels in each cell of the predefined color pattern 500 are interpolated 525 to produce a low-resolution Bayer color pattern image 530. The interpolation in 525 is illustrated by the diagonal lines connecting circled pixels in FIG. 5E. The resulting Bayer color pattern image 530 is illustrated in FIG. 5F. The pixels shown in FIG. 5F are computed as follows:

GI0=(G1+G4)/2
RI2=(R3+R6)/2
BI6=(B9+B12)/2
GI8=(G11+G14)/2

The low-resolution Bayer color pattern image 530 is interpolated using an algorithm is selected from known algorithms in processing step 535, producing an interpolated low-resolution color image 540. This interpolated low-resolution color image 540 is illustrated in FIG. 5G. In step 545, the low-resolution panchromatic image 520 is subtracted from the interpolated low-resolution color image 540, producing a low-resolution color difference image 550, illustrated in FIG. 5H. In step 560, the low-resolution color difference image 550 is enhanced using the low-resolution panchromatic image 520, producing an enhanced low-resolution color difference image 570. This enhancement can include noise reduction.

In step 575, the enhanced low-resolution color difference image 570 is interpolated, such as with bilinear or bicubic interpolation, to produce a high-resolution color difference image 580, illustrated in FIG. 5I. In step 585, the enhanced high-resolution panchromatic image 515 is added to the high-resolution color difference image 580, producing the high-resolution color image 590, illustrated in FIG. 5J. The processing flow shown here includes only spatial operations. Other operations known to those skilled in the art of color image processing, such as tone scale, color balance, color correction, and gamma correction would all be included in a complete processing chain.

Figure 6:
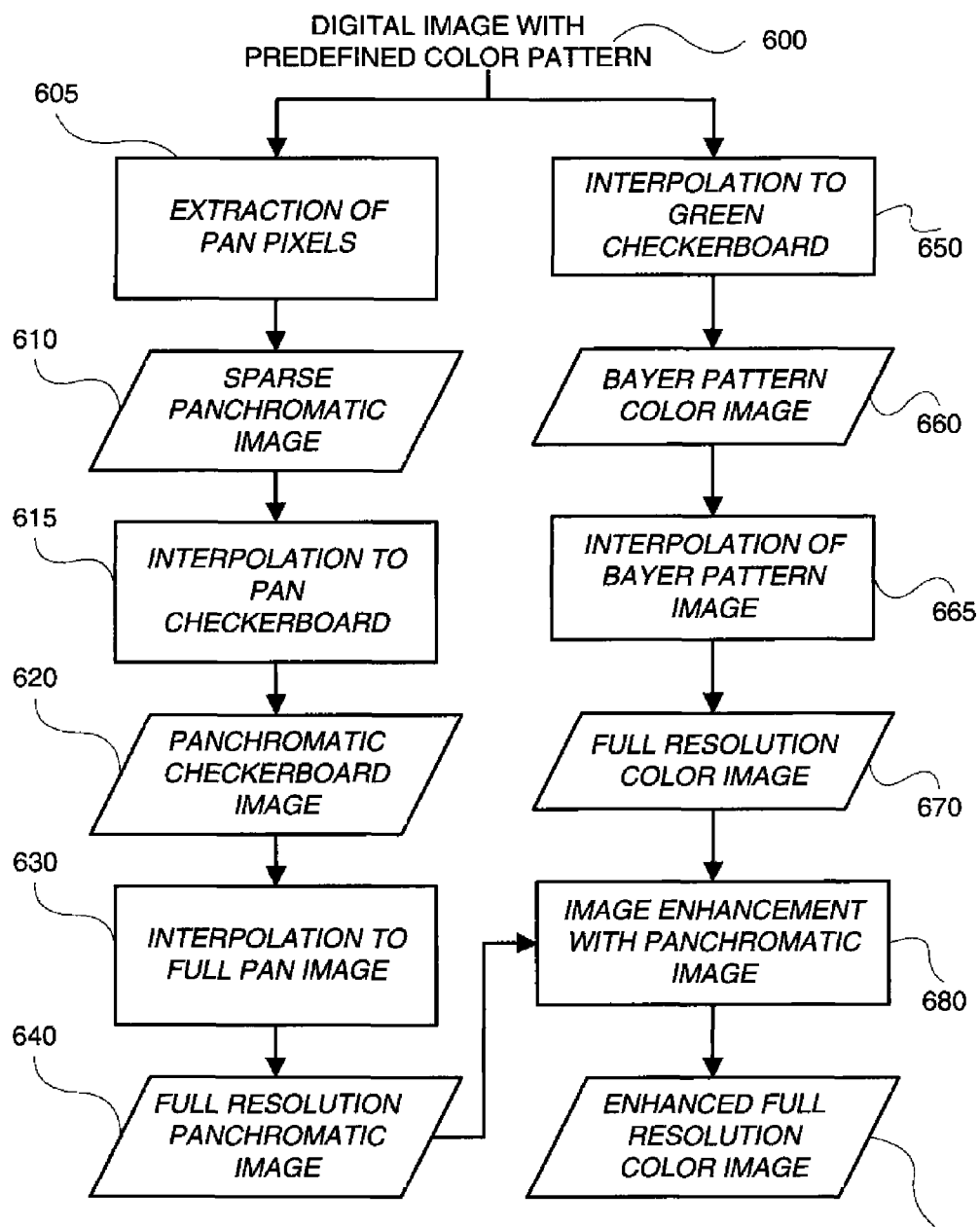
FIG. 6 is a block diagram for processing an image with a predefined color pattern to a full color image.

A second preferred embodiment for this invention is shown in FIG. 6. This processing flow starts with an image having a predefined color pattern 600, which is illustrated in FIG. 7A and shown below:

| G | R | G | R |
| B | P | B | P |
| G | R | G | R |
| B | P | B | P |

The preferred processing for this pattern begins with the extraction of panchromatic pixels 605 from the starting image, shown here for clarity as a distinct sparse panchromatic image 610 in FIG. 7B. In this embodiment, the next processing step 615 is the interpolation of alternating panchromatic pixels 615, to create a panchromatic image with a checkerboard pattern 620.

The preferred calculations for step 615 are shown below, referring to FIGS. 7A-7C. The steps shown adaptively interpolate a pixel value P10 for the location occupied by pixel G10. These calculations use pixels P5, P7, P13, P15, and four additional temporary pixel values.
  PT6=(P5+P7)/2
  PT9=(P5+P13)/2
  PT11=(P7+P15)/2
  PT14=(P13+P15)/2
To find a pan interpolated value for the position held by G10 the pair of pixels with the smallest difference is used to interpolate P10.
  gradBackslash=abs(P5−P15)
  gradSlash=abs(P7−P13)
  gradVert=abs(PT6−PT14)
  gradHoriz=abs(PT9−PT11)
These four classifiers are tested and the minimum value is found. The predictor complementing the minimum classifier is used to predict P10.
  predBackslash=(P5+P15)/2
  predSlash=(P7+P13)/2
  predVert=(PT6+PT14)/2
  predHoriz=(PT9+PT11)/2
If the absolute value of gradBackslash−gradSlash is below a threshold then P5 can be the average of P5, P7, P13, and P15.

The result of the interpolation step 615 produces the panchromatic image with checkerboard pattern 620, illustrated in FIG. 7D.

The next step 630 is interpolation of the panchromatic image with checkerboard pattern 620 to a full panchromatic image 640, illustrated in FIG. 7E. Note that step 630 is essentially identical to the problem of interpolating the green channel in the standard Bayer pattern image, allowing use of known algorithms techniques for this processing step.

Returning to the top of FIG. 6, step 650 interpolates green pixel values for pan pixel locations in the starting color image 600, filling in the green checkerboard of a standard Bayer color image 660.

The preferred calculations for step 650 are shown below, referring to FIGS. 7A and 7F. These calculations adaptively interpolate a pixel value G5 for the location occupied by pixel P5. These calculations use pixels G0, G2, G8, and G10 and four additional temporary pixel values.
  GT1=(G0+G2)/2
  GT9=(G8+G10)/2
  GT4=(G0+G8)/2
  GT6=(G2+G10)/2
To find a green interpolated value for the position held by P5 the pair of pixels with the smallest difference is used to interpolate G5
  gradBackslash=abs(G0−G10)
  gradSlash=abs(G8−G2)
  gradvert=abs(GT1−GT8)
  gradHoriz=abs(GT4−GT6)
These four classifiers are tested and the minimum value is found. The predictor complementing the minimum classifier is used to predict G5.
  predBackslash=(G0+G10)/2
  predSlash=(G2+G8)/2
  predVert=(GT1+GT9)/2
  predHoriz=(GT4+GT6)
If the absolute value of gradBackslash−gradSlash is below a threshold then G5 can be the average of G0, G2, G8, and G10. The result of this interpolation step is an RGB Bayer pattern, illustrated in FIG. 7G. At this point, a known technique for conventional Bayer pattern interpolation 665 is used to produce a full resolution color image 670, illustrated in FIG. 7H. This process gives us the full resolution color image 670 and the full resolution panchromatic image 640. The full resolution panchromatic image 640 is used to enhance the full resolution color image 670 in processing step 680, such as using the panchromatic image to guide noise reduction and sharpening of the full color image, producing an enhanced full resolution color image 690.

Figure 8:
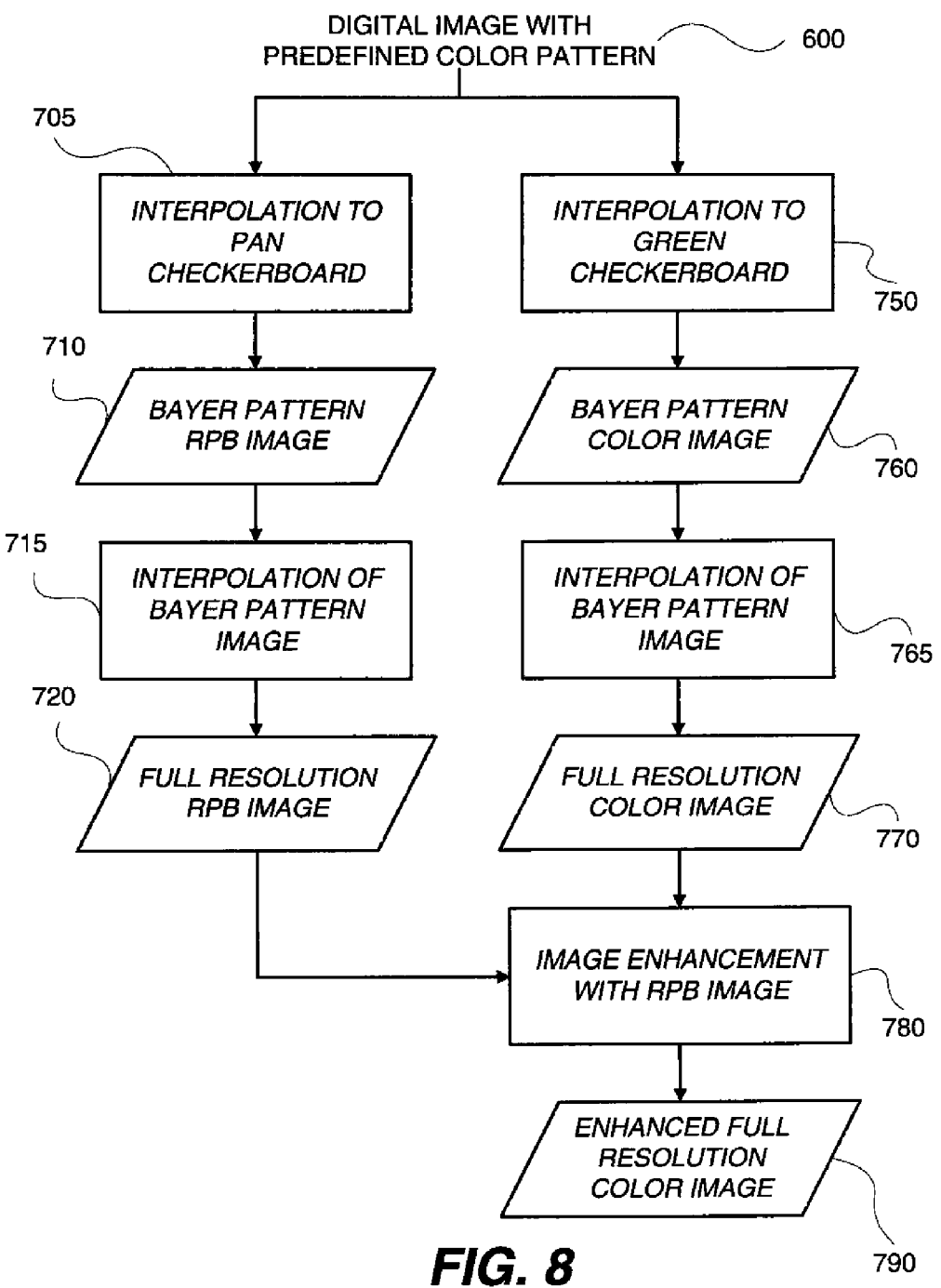
FIG. 8 is a block diagram for processing an image with a predefined color pattern to a full color image.

A third preferred embodiment for this invention is shown in FIG. 8. This processing flow starts with an image having a predefined color pattern 600, which is illustrated in FIG. 7A and shown below:

| G | R | G | R |
| B | P | B | P |
| G | R | G | R |
| B | P | B | P |

The preferred processing for this pattern begins with the interpolation of panchromatic pixels 705 from the starting image to create a Bayer pattern RPB image 710, illustrated in FIG. 9. The preferred calculations for step 705 are the same as those shown in the second embodiment for interpolating a pan checkerboard. The next processing step is the use of a known technique for Bayer pattern interpolation 715 to create a full resolution RPB image 720. This image is a full three color image, although the effective spectral sensitivity of the panchromatic channel is not a good match to a color matching function.

Returning to the top of FIG. 8, step 750 interpolates green pixel values for pan pixel locations in the starting color image 600, filling in the green checkerboard of a standard Bayer color image 760. The preferred calculations for step 750 are the same as those for step 650 in the second embodiment. At this point, a known technique for conventional Bayer pattern interpolation 765 is used to produce a full color RGB image 770. In step 780, the full resolution RPB image 720 is used to enhance the full color RGB image 770, such as using the panchromatic image to guide noise reduction and sharpening of the full color image, producing an enhanced full resolution color image 790.

Figure 10:
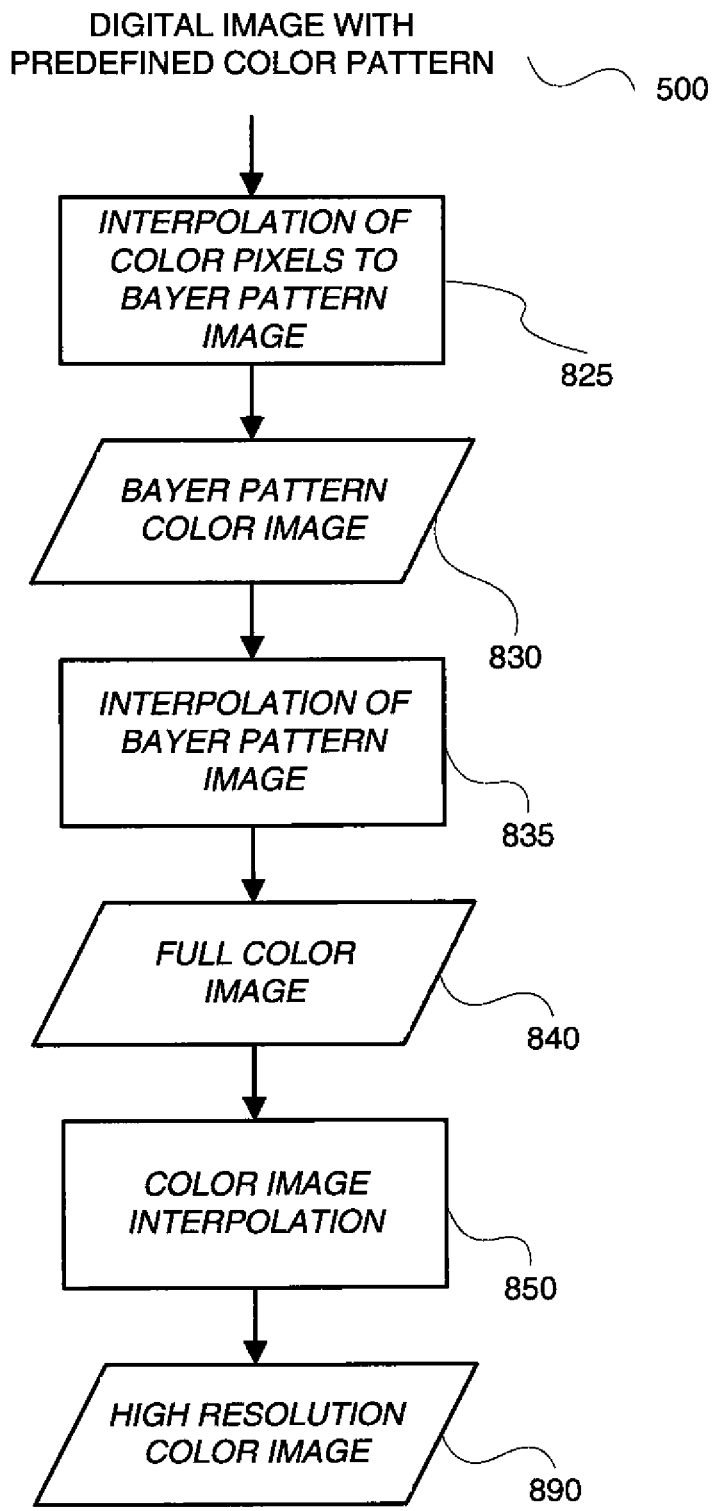
FIG. 10 is a block diagram for processing an image with a predefined color pattern to a full color image.

A fourth preferred embodiment for this invention is shown in FIG. 10. This processing flow starts with an image having a predefined color pattern 500, which is illustrated in FIG. 11A and shown below:

| P | G | P | R |
|---|---|---|---|
| G | P | R | P |
| P | B | P | G |
| B | P | G | P |

Figures 11A, 11B, 11C, 11D, 11E, 11F:
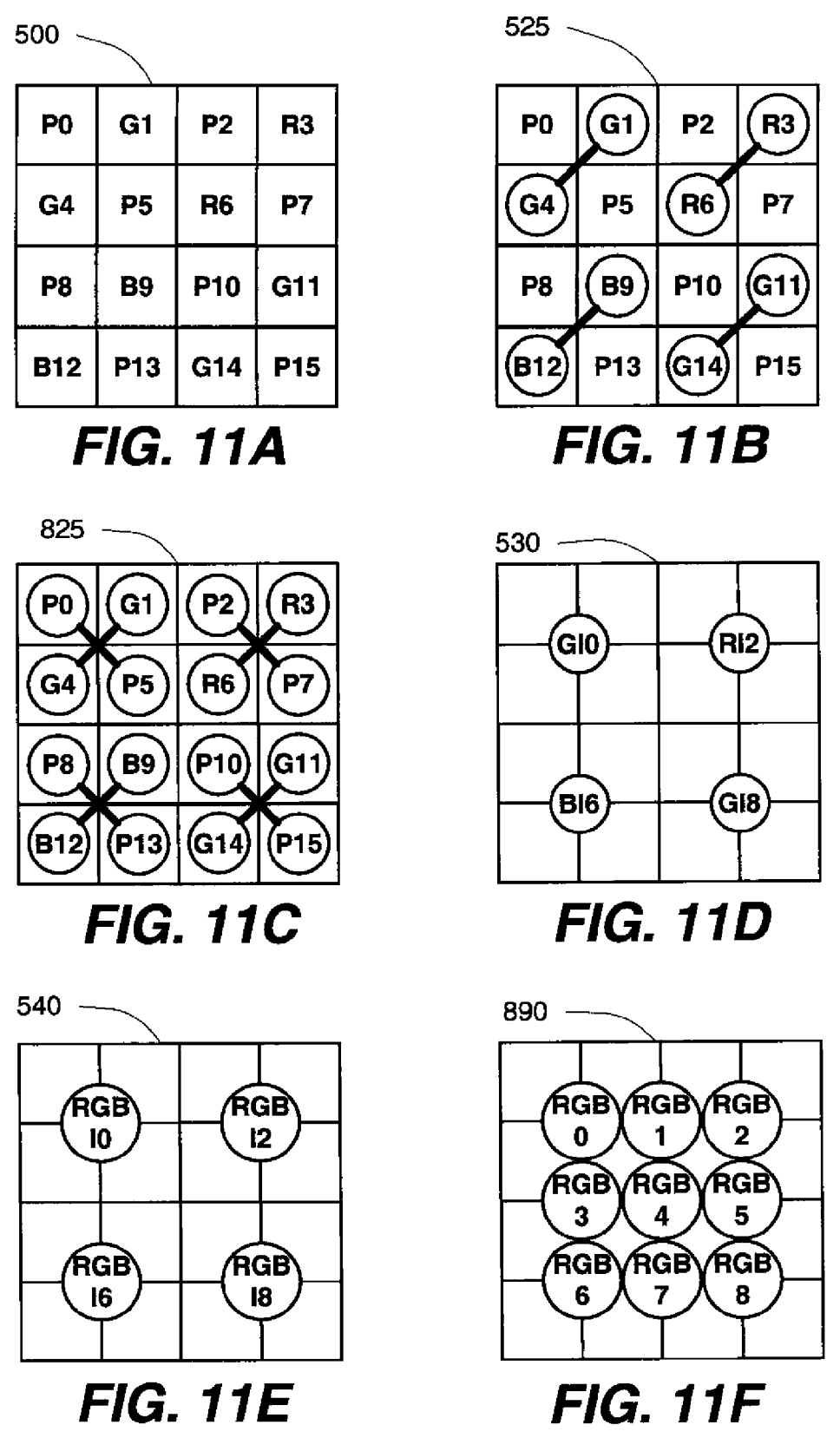

The processing for this embodiment begins with the interpolation of color pixels 825 from the starting image to create a low resolution Bayer pattern RGB image 830, illustrated in FIG. 11C. A preferred method for doing this is bilinear interpolation, illustrated by the diagonal lines connecting pairs of circled pixels in FIG. 11B. Specifically, the pixels shown in FIG. 11D are computed as follows:

GI0=(G1+G4)/2
RI2=(R3+R6)/2
BI6=(B12+B9)/2
GI8=(G11+G14)/2

Step 825 can also include panchromatic pixels in the interpolation, as illustrated in FIG. 11C. Specifically, several of the pixels shown in FIG. 11D can be computed as follows:

GI0=(G1+G4+P0+P5)/4
RI2=(R3+R6+P2+P7)/4
BI6=(B12+B9+P8+P13)/4
GI8=(G11+G14+P10+P15)/4

In this case, the Bayer color pattern image produced has different effective spectral sensitivities than the original color and panchromatic pixels. By mixing panchromatic and color pixels, the color pixels produced have a spectral sensitivity that is a combination of the original spectral sensitivities. Other processing steps, such as color balance and color correction, can be adjusted accordingly.

After converting the image to a Bayer color pattern 830, a known technique for conventional Bayer pattern interpolation 835 is used to produce a full color RGB image 840, illustrated in FIG. 11E.

After obtaining the full color RGB image 840, another processing step 850 can be included. In step 850, the full color RGB image 840 is interpolated, such as with bilinear or bicubic interpolation, to produce a high-resolution color image 890, illustrated in FIG. 11F. This additional processing step would be included if it is important to provide a color image with the approximately the same dimensions as the starting color pattern image 500. If the computing resources are not available or the dimensions of the full color image are not critical, then processing can stop once the full color RGB image 840 is provided.

These embodiments have illustrated processing from color patterns that include panchromatic pixels. Color patterns that do not include panchromatic pixels can be used to provide a derived panchromatic image by combining pixels in the initial color pattern. The pixels in the derived panchromatic image must have controlled centers to match the interpolation of other color channels in order to avoid introducing spatial artifacts. For example, assuming you start with a traditional Bayer pattern, then contiguous red green and blue pixels can be combined to provide the equivalent of a panchromatic pixel. In this way, a panchromatic image can be readily derived and used to enhance the color image as described above.

These embodiments have specifically described processing from CFA patterns using R, G, B and P pixels. The same processing paths can also be used with C, M, Y, and P pixels with only minor alterations (such as different color correction and noise reduction parameters). For clarity, these embodiments describe color filter pattern and other images without specific reference to the details of memory management. This invention can be practiced with a variety of memory and buffer management approaches.

The invention has been described in detail with particular reference to certain preferred embodiments thereof, but it will be understood that variations and modifications are effected within the spirit and scope of the invention.

| PARTS LIST | |
|---|---|
| 10 | light from subject scene |
| 11 | imaging stage |
| 12 | lens |
| 13 | neutral density filter |
| 14 | iris |
| 16 | brightness sensor |
| 18 | shutter |
| 20 | image sensor |
| 22 | analog signal processor |
| 24 | analog to digital (A/D) converter |
| 26 | timing generator |
| 28 | image sensor stage |
| 30 | digital signal processor (DSP) bus |
| 32 | digital signal processor (DSP) memory |
| 36 | digital signal processor (DSP) |
| 38 | processing stage |
| 40 | exposure controller |
| 50 | system controller |
| 52 | system controller bus |
| 54 | program memory |
| 56 | system memory |
| 57 | host interface |
| 60 | memory card interface |
| 62 | memory card socket |
| 64 | memory card |
| 70 | viewfinder display |
| 72 | exposure display |
| 74 | user inputs |
| 76 | status display |
| 80 | video encoder |
| 82 | display controller |
| 88 | image display |
| 100 | minimal repeating unit for Bayer pattern |
| 102 | repeating unit for Bayer pattern that is not minimal |
| 110 | spectral transmission curve of infrared blocking filter |
| 112 | unfiltered spectral photoresponse curve of sensor |
| 114 | red photoresponse curve of sensor |
| 116 | geen photoresponse curve of sensor |
| 118 | blue photoresponse curve of sensor |

PARTS LIST

| | |
|---|---|
| 500 | image with predefined color pattern |
| 505 | processing step |
| 510 | high resolution panchromatic image |
| 512 | processing step |
| 515 | enhanced high resolution panchromatic image |
| 517 | processing step |
| 520 | low resolution panchromatic image |
| 525 | processing step |
| 530 | low resolution Bayer color pattern image |
| 535 | processing step |
| 540 | interpolated low resolution color image |
| 545 | processing step |
| 550 | low resolution color difference image |
| 560 | processing step |
| 570 | enhanced low resolution color difference image |
| 575 | processing step |
| 580 | high resolution color difference image |
| 585 | processing step |
| 590 | high resolution color image |
| 600 | image with predefined color pattern |
| 605 | processing step |
| 610 | distinct sparse panchromatic image |
| 615 | processing step |
| 620 | panchromatic image with checker board pattern |
| 630 | processing step |
| 640 | full resolution panchromatic image |
| 650 | processing step |
| 660 | standard Bayer color image |
| 665 | processing step |
| 670 | full resolution color image |
| 680 | processing step |
| 690 | enhanced full resolution color image |
| 705 | processing step |
| 710 | Bayer pattern RGB image |
| 715 | processing step |
| 720 | full resolution RGB image |
| 750 | processing step |
| 760 | standard Bayer color image |
| 765 | processing step |
| 770 | full color RGB image |
| 780 | processing step |
| 790 | enhanced full resolution color image |
| 825 | processing step |
| 830 | Bayer color pattern |
| 835 | Bayer pattern interpolation |
| 840 | full color RGB image |
| 850 | processing step |
| 890 | high resolution color image |

The invention claimed is:

1. A method of processing a digital image having a predetermined color pattern representing an image with a minimal repeating unit, to make use of algorithms that are suitable for processing another color pattern with a different minimal repeating unit, comprising:
   (a) providing a first two-dimensional array of pixels from the image capture device, some of which are color pixels, and some of which are panchromatic pixels, wherein the predetermined color pattern has a minimal repeating unit of:

| P | G | P | R |
|---|---|---|---|
| G | P | R | P |
| P | B | P | G |
| B | P | G | P | wherein P represents a panchromatic pixel, G represents a green pixel, R represents a red pixel, and B represents a blue pixel;
   (b) converting the digital image having the predetermined color pattern into a converted digital image having a different desired color pattern with a different minimal repeating unit than in the predetermined color pattern; and
   (c) using a processor having algorithms adapted for use with the desired color pattern for processing the converted digital image to provide a processed color image.

2. The method of claim 1 wherein the desired color pattern is a Bayer pattern.

3. A method of processing a digital image having a predetermined color pattern representing an image with a minimal repeating unit, to make use of algorithms that are suitable for processing another color pattern with a different minimal repeating unit, comprising:
   (a) providing a first two-dimensional array of pixels from the image capture device, some of which are color pixels, and some of which are panchromatic pixels, wherein the predetermined color pattern has a minimal repeating unit of:

| P | Y | P | C |
|---|---|---|---|
| Y | P | C | P |
| P | M | P | Y |
| M | P | Y | P | wherein P represents a panchromatic pixel, Y represents a yellow pixel, C represents a cyan pixel, and M represents a magenta pixel;
   (b) converting the digital image having the predetermined color pattern into a converted digital image having a different desired color pattern with a different minimal repeating unit than in the predetermined color pattern; and
   (c) using a processor having algorithms adapted for use with the desired color pattern for processing the converted digital image to provide a processed color image.

4. The method of claim 3 wherein the desired color pattern is a Bayer pattern.

* * * * *

UNITED STATES PATENT AND TRADEMARK OFFICE
CERTIFICATE OF CORRECTION

Page 1 of 1

PATENT NO. : 8,452,082 B2
APPLICATION NO. : 11/862230
DATED : May 28, 2013
INVENTOR(S) : Palum et al.

It is certified that error appears in the above-identified patent and that said Letters Patent is hereby corrected as shown below:

In the Drawings

In Fig. 4, Sheet 3 of 10, for Tag "560", in Line 1, delete "RES" and insert -- RESOLUTION --, therefor.

In Fig. 4, Sheet 3 of 10, for Tag "570", in Line 2, delete "RES" and insert -- RESOLUTION --, therefor.

In the Specification

In Column 10, Line 28, delete "G5" and insert -- G5. --, therefor.

In Column 10, Line 31, delete "gradvert=abs(GT1-GT8)" and insert -- gradVert=abs(GTI-GT8) --, therefor.

In Column 12, Line 65, delete "116 geen" and insert -- 116 green --, therefor.

Signed and Sealed this
Eighteenth Day of March, 2014

Michelle K. Lee
*Deputy Director of the United States Patent and Trademark Office*

UNITED STATES PATENT AND TRADEMARK OFFICE
CERTIFICATE OF CORRECTION

| | | Page 1 of 1 |
|---|---|---|
| PATENT NO. | : 8,452,082 B2 | |
| APPLICATION NO. | : 11/862230 | |
| DATED | : May 28, 2013 | |
| INVENTOR(S) | : Palum et al. | |

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1364 days.

Signed and Sealed this
Thirtieth Day of December, 2014

Michelle K. Lee
*Deputy Director of the United States Patent and Trademark Office*